(12) United States Patent
Koishi et al.

(10) Patent No.: US 6,349,018 B2
(45) Date of Patent: *Feb. 19, 2002

(54) NEGATIVE PRESSURE AIR BEARING SLIDER

(75) Inventors: Ryosuke Koishi; Yoshifumi Mizoshita, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,970

(22) Filed: Jun. 17, 1999

(30) Foreign Application Priority Data

Sep. 28, 1998 (JP) .......................... 10-272711
Nov. 27, 1998 (JP) .......................... 10-336834

(51) Int. Cl.⁷ ................................. G11B 5/60
(52) U.S. Cl. ................. 360/236.3; 360/235.6; 360/235.8; 360/236; 360/236.2; 360/235.7
(58) Field of Search ................ 360/235.6, 235.7, 360/235.8, 236.3, 236.2, 237, 236

(56) References Cited

U.S. PATENT DOCUMENTS

| 5,086,360 | A | * | 2/1992 | Smith et al. ............... 360/103 |
|---|---|---|---|---|
| 5,309,303 | A | | 5/1994 | Hsia et al. ............... 360/103 |
| 5,734,522 | A | * | 3/1998 | Shrinkle ............... 360/103 |
| 5,822,153 | A | * | 10/1998 | Lairson et al. ............... 360/103 |
| 6,040,958 | A | * | 3/2000 | Yamamoto et al. ............... 360/103 |
| 6,055,128 | A | * | 4/2000 | Dorius et al. ............... 360/103 |
| 6,172,851 | B1 | * | 1/2001 | Utsunomiya ............... 360/236.3 |

FOREIGN PATENT DOCUMENTS

| JP | 08147917 | 6/1996 |
|---|---|---|
| JP | 09106528 | 4/1997 |
| JP | 09115258 | 5/1997 |
| JP | 10050019 | 2/1998 |

* cited by examiner

Primary Examiner—Robert S. Tupper
(74) Attorney, Agent, or Firm—Greer, Burns & Crain, LTD

(57) ABSTRACT

A negative pressure air bearing slider including a first air bearing surface formed on the bottom of the slider body at the upstream position so as to extend in the lateral direction of the slider body, and a pair of second air bearing surfaces formed on the bottom of the slider body separately from the first air bearing surface at downstream positions spaced in the lateral direction so as to define an air stream passage therebetween. The second air bearing surfaces serve to generate positive pressures that are spaced apart at downstream positions where a transducer element is embedded in the slider body, so that the slider's stiffness to rolling action can be enhanced. The cooperation of the front and rear rails enables for the creation of a higher negative pressure.

17 Claims, 11 Drawing Sheets

NEGATIVE PRESSURE AIR BEARING SLIDER

The present invention relates to a negative pressure air bearing slider intended to be employed in an information storage device such as a magnetic disk drive.

BACKGROUND OF THE INVENTION

Air bearing sliders are often employed in magnetic disk drives. The air bearing slider allows a transducer element to fly above the disk surface of a magnetic disk when information is read or written from or onto the magnetic disk. Alternatively, the slider may be positioned below the magnetic disk, in which case the slider flies a slight distance below the lower disk surface. Either way, an air bearing surface (ABS) is defined on the surface of the slider body that opposes the disk surface. When the storage disk rotates, an air stream generated along the disk surface acts upon the air bearing surface to separate the slider body a slight distance from the disk surface. For the sake of simplicity, throughout this specification, this separation will be referred to as the flying height, regardless of whether the slider is above the disk or below the disk.

Recently, higher and higher storage densities are being expected in the field of magnetic disk drives. In order to achieve a higher storage density, it is beneficial to reduce the flying height of the slider body. However, as the flying height is reduced, the slider body tends to collide with the disk surface during flying.

Some prior art devices include a negative pressure air bearing slider that is capable of generating negative pressure that opposes the lift (or positive pressure) acting upon the air bearing surface. The balance between the negative pressure and the lift serves to restrict the flying height in this type of negative pressure air bearing slider. The negative pressure serves to draw the slider body toward the disk surface so that it is possible to stabilize the flying behavior of the slider body. As a result, the probability of collisions between the slider body and the disk surface can be reduced.

The growing demand for higher storage densities requires further improvements in the stability of the slider body, and at the same time also requires an increased resistance to any rolling action of the slider body. If sufficient resistance to rolling is not present, the slider body tends to roll around its center axis along the air stream during flying, and the slider body may collide with the disk surface.

It is accordingly an object of the present invention to provide a negative pressure air bearing slider with both increased stability and an increased resistance to rolling during flying.

SUMMARY OF THE INVENTION

According to a first aspect of the present invention, there is provided a negative pressure air bearing slider that includes a first air bearing surface formed on a bottom of a slider body at an upstream position so as to extend in a lateral direction of the slider body; and a pair of second air bearing surfaces formed on the bottom of the slider body separately from the first air bearing surface at downstream positions that are spaced apart in the lateral direction so as to define an air stream passage therebetween.

With the aforementioned slider, the second air bearing surfaces that are spaced apart in the lateral direction serve to generate the lift or positive pressure at the downstream position at which a transducer or head element is in general embedded in the slider body. Since a pair of spaced lifts support the slider body at the downstream position, it is possible to remarkably enhance the slider body's stiffness to rolling action.

The first air bearing surface may be defined on the lower surface of a front rail that extends from the bottom of the slider body near an upstream end thereof. The front rail also extends in the lateral direction of the slider body. The front rail foremost receives the air stream along the disk surface, so that the negative pressure generated behind the front rail cannot be reduced. In addition, the second air bearing surfaces may be respectively defined on lower surfaces of a pair of rear rails that extend from the bottom of the slider body at the downstream positions. These rear rails are spaced in the lateral direction so as to define the air stream passage therebetween.

The first and second air bearing surfaces are preferably connected to the lower surfaces of the front and rear rails via steps. The steps serve to generate a higher positive pressure at the first and second air bearing surfaces.

The negative pressure air bearing slider preferably includes a pair of side rails that are formed on the bottom of the slider body so as to extend downstream from the lateral ends of the front rail. The side rails serve to prevent the air stream that flows around the lateral ends of the front rail from entering the space behind the front rail. Accordingly, it is possible to reliably generate a higher negative pressure behind the front rail. In particular, the side rails preferably have a thickness that is smaller than that of the rear rails in the lateral direction. The thinner side rails serve to enlarge a negative pressure cavity surrounded by the side rails behind the front rail, so that the negative pressure can be increased.

Moreover, a groove is preferably formed in the side rail so as to draw air running around the front rail into the air stream passage. The groove serves to avoid saturation of the negative pressure at lower tangential velocities of the storage disk, even if lower front and rear rails are employed. As a result, the groove enables the negative pressure to reliably follow increases of the tangential velocity, so that the negative pressure air bearing slider may keep the flying height of the slider body constant, irrespective of variations in the tangential velocity.

In addition, a pad may be formed on the lower surface of the front or rear rail so as to prevent the first or second air bearing surface from sticking to the disk surface of a storage disk when the slider body is seated upon the disk surface. Such pads serve to avoid the first or second air bearing surface from directly contacting the disk surface. As a result, less adhesion of a lubricating agent or oil spread over the disk surface acts on the slider body, so that the slider body can immediately take off from the disk surface at the beginning of rotation of the storage disk.

Further, the second air bearing surface in which a transducer element is embedded may have a surface area that is smaller than that of the other second air bearing surface. The smaller second air bearing surface with a transducer element serves to keep the slider body in a slanted attitude by a roll angle. Accordingly, it is possible to minimize the distance between the bottom of the slider body and the disk surface around the transducer element.

When the second air bearing surface with the transducer element is intended to be smaller than the other air bearing surface, the second air bearing surface with the transducer element may have an upstream end extending by a first width in the lateral direction so as to lead to the step, and a downstream end extending by a second width that is larger than the first width in the lateral direction. For example, in the case where the transducer element comprises a magnetoresistance (MR) element, the MR element should be protected between a pair of shield layers. If the shield layers fail to have a lateral size that is large enough to shield the MR element from magnetic interference of the vicinal magnetic field, the MR element will not be able to correctly read data. In general, the slider body is kept in a slanted attitude to bring the downstream end closer to the disk surface. As long as the slanted attitude is kept, the transducer element embedded in the slider body at the downstream position can approach the disk surface. Accordingly, the wider downstream end enables the second air bearing surface to be of a smaller area, while still keeping the larger lateral size of the shield layers at the same time.

In addition, when the second air bearing surface with the transducer element is intended to be smaller than the other air bearing surface, an upstream end extending in the lateral direction so as to define the step in front of the second air bearing surface with the transducer element may be disposed more downstream than an upstream end extending in the lateral direction so as to define the step in front of the other second air bearing surface. Such disposition of the second air bearing surfaces serves to reduce the length of the second air bearing surface with the transducer element in the direction of air stream as compared with that of the other second air bearing surface. Accordingly, the smaller second air bearing surface can be realized to set the lift at the second air bearing surface with the transducer element that is smaller than that of the other second bearing surface. It is therefore possible to reduce the lift at the second air bearing surface with the transducer element without a reduction in the lateral width of the shield layers.

When the upstream end of the second air bearing surface with the transducer is displaced downstream as described above, it is preferable to adjust the size of the groove between the rear and side rails. For example, if the side rail fails to extend toward the rear rail to follow the displacement of the upstream end of the second air bearing surface, the groove becomes larger or wider. The wider groove may release the negative pressure generated behind the front rail. On the other hand, when the side rail is extended to follow the displacement of the upstream end, a smaller or narrower groove can be obtained, so that a higher negative pressure can be maintained behind the front rail. A higher negative pressure enables the second air bearing surface with the transducer element to reliably approach the disk surface as closely as possible.

Furthermore, when the lift at the second air bearing surface with the transducer element needs to be reduced, for example, the position of the second air bearing surface can be determined relative to the lower surface of the rear rail. The aforementioned higher positive pressure generated at the steps depends upon not only its areas and heights, in addition to the area of the second air bearing surfaces, but also upon the extent of the lower surfaces leading to the steps on the rear rails. Smaller lower surfaces make less positive pressure, while larger surfaces make larger positive pressure. Accordingly, if the lateral width of the lower surface leading to the step facing outward of the slider body on the rear rail is reduced, the lift can be reduced at the second air bearing surface with the transducer element, since the step facing outward of the slider body tends to receive a larger amount of air stream than the step facing inward of the slider body.

Furthermore, when the lift at the second air bearing surface with the transducer element needs to be reduced, for example, the second air bearing surface with the transducer element may include a downstream end extending in the lateral direction at the downstream position and displaced upstream. The aforementioned negative pressure air bearing slider has the maximum positive pressure at the downstream end of the slider body. Accordingly, when the downstream end is displaced upstream so as to reduce the area of the second air bearing surface with the transducer element, the lift can be efficiently reduced at the second air bearing surface with the transducer element.

It should be noted that the negative pressure air bearing slider of the present invention may be employed in storage disk drives such as a hard disk drive unit (HDD).

BRIEF DESCRIPTION OF THE DRAWINGS

Preferred embodiments of the present invention are described herein with reference to the drawings wherein.

DESCRIPTION OF THE PREFERRED EMBODIMENTS

Figure 1:
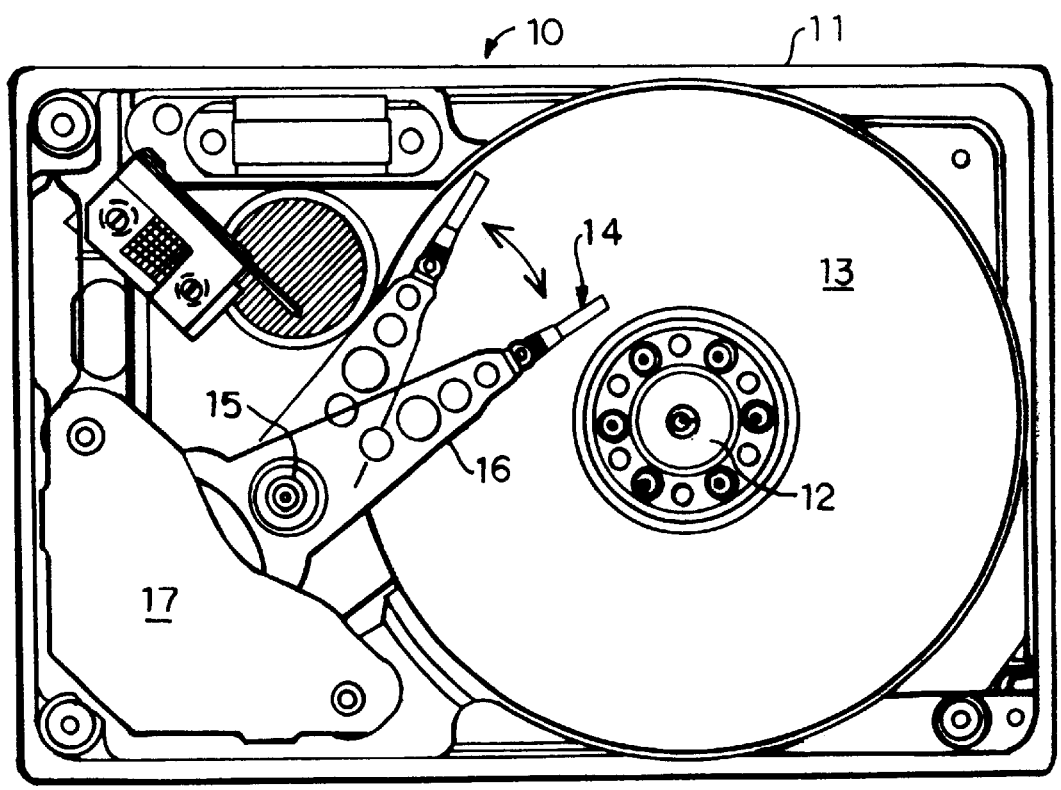
FIG. 1 is a plan view illustrating an interior of a hard disk drive unit (HDD)

FIG. 1 illustrates and interior structure of a hard disk drive unit (HDD) 10 which is an example of one type of magnetic disk drive used in the present invention. However, it should be noted that the present invention may also be applied to other types of disk drives, including magneto-optical (MO) drives, employing floating sliders. The HDD 10 has a housing 11 for accommodating magnetic disks 13, which are mounted on a spindle motor 12. A negative pressure air bearing slider is positioned to oppose one surface of the magnetic disk 13. The negative pressure air bearing slider 14 is fixed at the tip end of a carriage arm 16, which is capable of swinging about a shaft 15. When information is read or written from or to the magnetic disk 13, the carriage arm 16 is driven to rotate by the action of an actuator 17 comprising a magnetic circuit, so that the negative pressure air bearing slider 14 is positioned above a target recording cylinder on the storage disk 13. The interior space of the housing 11 can be closed with a cover, not shown.

Figure 2:
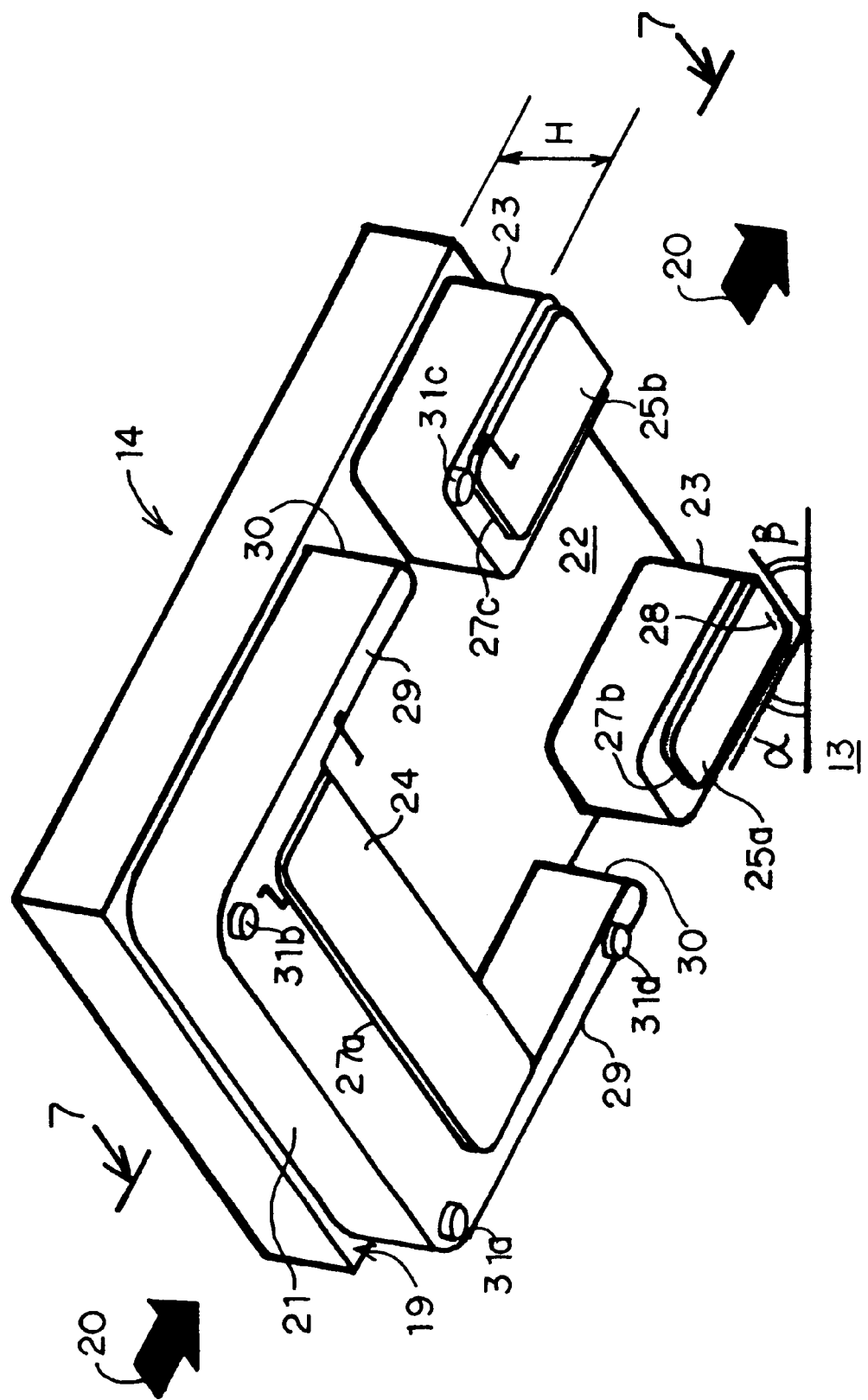
FIG. 2 is an enlarged perspective view illustrating a negative pressure air bearing slider according to one embodiment of the present invention.

FIG. 2 illustrates the negative pressure air bearing slider 14 according to one embodiment of the present invention. The slider 14 has a slider body that includes a bottom 19 that is opposed to the storage disk 13. A front rail 21 is formed to extend laterally from the bottom 19 of the slider body at its upstream end. Likewise, a pair of rear rails 23 are formed to extend from the bottom 19 of the slider body at its downstream end. Rear rails 23 are spaced from each other in the lateral direction to define an air stream passage 22 therebetween. The "upstream" and "downstream" ends are defined based on the direction of the air stream 20 that is generated when the magnetic disk 13 rotates.

A first air bearing surface 24 is defined on the lower surface of the front rail 21 so as to extend in the lateral direction of the slider body. A pair of second air bearing surfaces 25a, 25b are defined respectively on the lower surfaces of the rear rails 23 so as to form a row in the lateral direction of the slider body with the air stream passage 22 interposed therebetween. When the magnetic disk 13 rotates and generates air stream 20 along the disk surface, the air stream 20 acts on the first and second air bearing surfaces 24, 25a, 25b. Lift is generated respectively on the first and second air bearing surfaces 24, 25a, 25b, which allows the slider body to fly above the disk surface. Since more lift can be generated on the first air bearing surface 24 in this negative pressure air bearing slider 14, the slider body maintains a slanted attitude at pitch angle α. "Pitch angle α" may be referred to as the inclination angle along the longitudinal direction of the slider body (i.e., in the direction of the air stream 20). In the preferred embodiment, the pitch angle α is preferably between approximately 50 and 150 μrad.

The first and second air bearing surfaces 24, 25a, 25b are connected respectively to the lower surfaces of the front and rear rails 21, 23 via steps 27a, 27b, 27c. The steps 27a, 27b, 27c serve to generate a larger lift at the first and second air bearing surfaces 24, 25a, 25b, as described herein below.

The second air bearing surface 25a has a smaller surface area than that of the second air bearing surface 25b. Accordingly, a larger lift can be generated on the second air bearing surface 25b than the second air bearing surface 25a in this negative pressure air bearing slider 14. As a result, the slider body maintains a slanted attitude at a roll angle β. "Roll angle β" may be referred to as the inclination angle along the lateral direction of the slider body (i.e., in the perpendicular direction to the air stream 20). In the preferred embodiment, the roll angle β is preferably between approximately 10 and 80 μrad.

A transducer or head element embedded in the slider body exposes a read/write gap 28 at the second air bearing surface 25a (which has a smaller area than surface 25b). The above-mentioned pitch and roll angles α, β serve to minimize the distance between the slider body and the disk surface near the read/write gap 28.

A pair of side rails 29 are connected to the opposite lateral ends of the front rail 21 so as to extend in the downstream direction. The side rails 29 serve to prevent the air stream from flowing around the lateral ends of the front rail 21, and from entering the space behind the front rail 21. Accordingly, the air stream crossing the first air bearing surface 24 spreads in the direction vertical to the disk surface and generates negative pressure behind the front rail 21. When the generated negative pressure is balanced with the aforementioned lift on the first and second air bearing surfaces 24, 25a, 25b, the flying height of the slider body can be maintained at a substantially constant value. Grooves 30 are defined between the side rails 29 and the rear rails 23, respectively, so as to draw the air stream flowing around the lateral ends of the front rail 21 into the air stream passage 22.

A plurality of pads 31a, 31b, 31c, 31d are formed on the lower surfaces of the front and rear rails 21, 23 so as to prevent the first and second air bearing surfaces 24, 25a, 25b from sticking to the disk surface of the magnetic disk 13 when the slider body is seated on the disk surface. Moreover, the pad 31d, which is located on the side of the second air bearing surface 25a generating a smaller lift, is disposed more upstream than the pad 31c, which is located on the side of the second air bearing surface 25b generating a larger lift. Since the roll angle β allows the second air bearing surface 25a to come closer to the disk surface, such disposition of the pad 31d helps to avoid collisions of the pad 31d with the disk surface.

When the magnetic disk 13 starts to rotate, the air stream 20 starts to flow along the disk surface. The air stream 20 serves to allow the negative pressure air bearing slider 14 seated on the disk surface to take off from the disk surface. Prior to taking off, the pads 31a, 31b, 31c, 31d keep the first and second air bearing surfaces 24, 25a, 25b at a slight distance above the disk surface. Accordingly, as a reduced surface area contacts the disk surface, there is less adhesion of the lubricating agent or oil that may be spread upon the disk surface acting upon the slider body. Therefore, it is easier for the slider body to take off from the disk surface. After taking off, the read/write gap 28 of the transducer element performs the reading and writing operations.

When the air stream acts on the slider 14, as shown in FIG. 3 for example, the lift (or positive pressure) and the negative pressure are generated along the bottom 19 of the slider body. FIG. 3 illustrates a pressure distribution (as calculated by a conventional computer simulation) for one example of an embodiment of the slider 14. The slider body in this negative pressure air bearing slider 14 has a length of 1.25 mm, a width of 1 mm, and a thickness of 0.3 mm. Of course other dimensions are also contemplated as being within the scope of the invention.

Figures 3A, 3B:
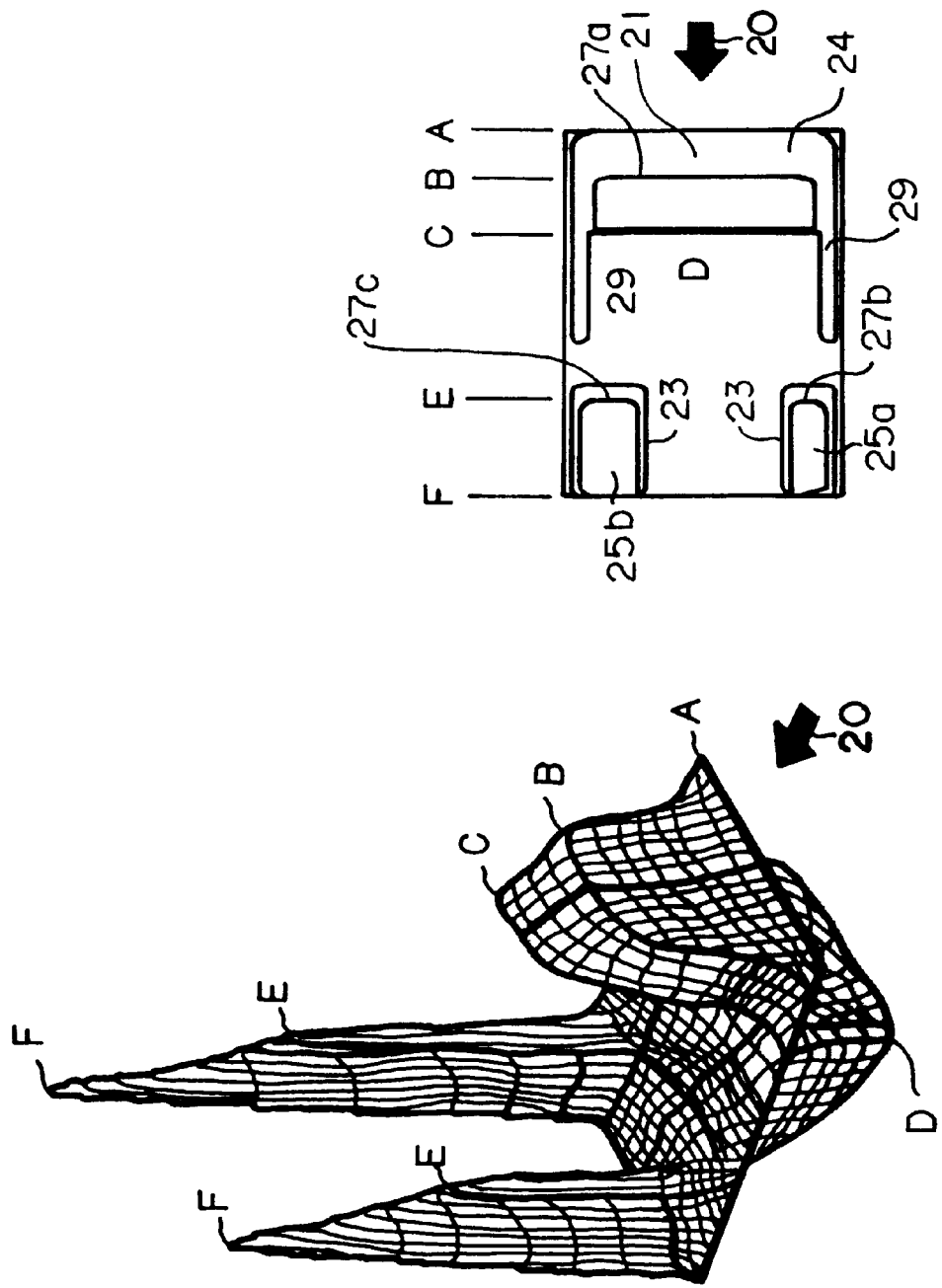
FIGS. 3A–3B illustrate the distribution of pressure for the negative pressure air bearing slider of FIG. 2.

As is apparent from FIGS. 3A and 3B, the air stream 20 generates a large positive pressure at the step 27a in front of the first air bearing surface 24, namely, at the position B. The positive pressure grows larger as the air stream 20 advances along the first air bearing surface 24.

When the air stream 20 has crossed the front rail 21, namely, at the position C, the positive pressure disappears. Negative pressure appears in place of the positive pressure at the position D. When the air stream 20 spreads in the direction vertical to the disk surface behind the front rail 21 this negative pressure is caused. In addition, the side rails 29 serve to prevent the air stream 20 that strikes the front face of the front rail 21 and then passes around the front rail 21 from entering the space behind the front rail 21. Accordingly, a larger negative pressure can be generated behind the front rail 21.

Upon reaching the rear rails 23 the air stream 20 generates other large positive pressures at the steps 27b, 27c in front of the second air bearing surfaces 25a, 25b, namely, position E. The positive pressure grows larger as the air stream 20 advances along the second air bearing surfaces 25a, 25b. The positive pressure disappears at the downstream ends of the second air bearing surfaces 25a, 25b, namely, at the position F.

The balance between the positive pressure, at the positions B to C and E to F, and the negative pressure, at the position D serves to fix the flying height of the slider body in this negative pressure air bearing slider 14. Moreover, when compared with conventional sliders, the larger positive pressure of the present invention is balanced with its larger negative pressure, so that higher stability in flying behavior is expected. The steps 27a, 27b, 27c preferably have a height equal to or less than 0.2 $\mu$m in order to balance the positive and negative pressures with each other.

In addition, the pair of second air bearing surfaces 25a, 25b create positive pressure at the downstream positions nearest to the disk surface when the slider body has the slanted attitude of pitch angle α, which enhances the slider's resistance to rolling.

In general, when the air pressure in the atmosphere where the magnetic disk drive 10 operates is low, the positive pressure at the first and second air bearing surfaces 24, 25a, 25b decreases in proportion to the reduction in air pressure. Accordingly, it is then necessary to reduce the negative pressure in proportion to the decrease in the positive pressure. If the negative pressure is kept constant when the positive pressure has been reduced, the flying height of the slider body will be decreased.

Figure 4:
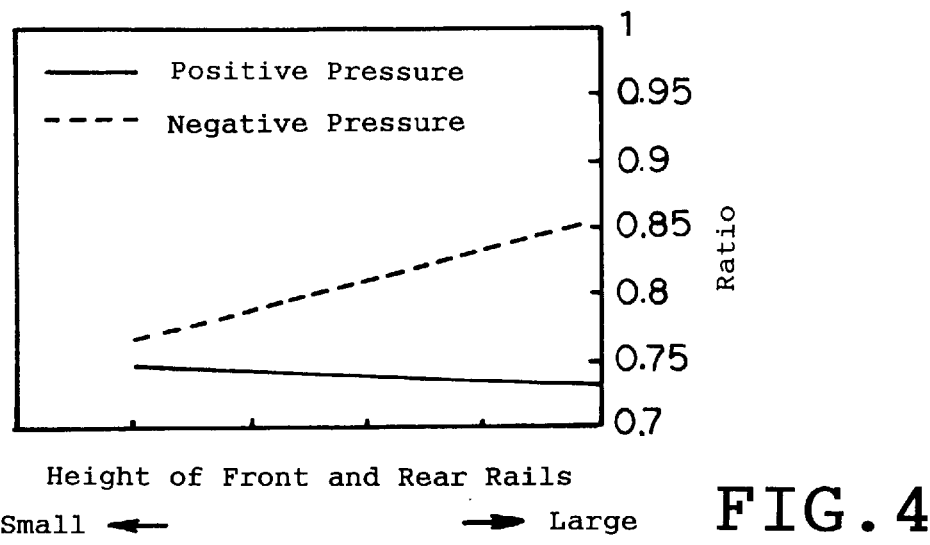
FIG. 4 is a graph demonstrating the effect of atmospheric pressure on the pressure generated on the negative pressure air bearing slider.

FIG. 4 is a graph illustrating the effects of variations in the air pressure. In the graph, the solid line shows the ratio of the positive pressure at an air pressure of 0.7 atm to the positive pressure at an air pressure of 1.0 atm. The dotted line shows the ratio of the negative pressure at an air pressure of 0.7 atm to the negative pressure at an air pressure of 1.0 atm. As is apparent from the graph, the ratio of the positive pressure varies only slightly in response to variations in the height H (FIG. 2) of the front and rear rails 21, 23 (i.e., the variation in the depth of the cavity surrounded by the front, side and rear rails 21, 29, 23). On the other hand, it can be observed that the difference between the ratio of the positive pressure and the ratio of the negative pressure decreases as the height of the front and rear rails 21, 23 decreases. Specifically, front and rear rails 21, 23 of lower heights better enable the negative pressure to follow variations in air pressure, so that it is possible to maintain a constant flying height of the slider body irrespective of variations in air pressure. It is expected that front and rear rails 21, 23 of lower heights will allow the slider body to better maintain a constant flying height at the various altitudes (with different atmospheric pressures) where the magnetic disk drive 10 will be operated. In this example of the first embodiment, the height H is preferably set to be no more than 2 $\mu$m.

Front and rear rails 21, 23 of lower heights may cause a saturation of the negative pressure at a relatively low tangential velocity of the magnetic disk 13. Such saturation occurs when the negative pressure cannot follow further increases of the lift or positive pressure at the first and second air bearing surfaces 24, 25a, 25b as the tangential velocity of the magnetic disk 13 increases. The faster the tangential velocity becomes, the larger the flying height of the slider body gets. For example, the flying height of the slider body gets larger at positions nearer to the periphery of the magnetic disk 13 at which the tangential velocity is larger than at positions nearer to the center of the magnetic disk 13.

Figure 5:
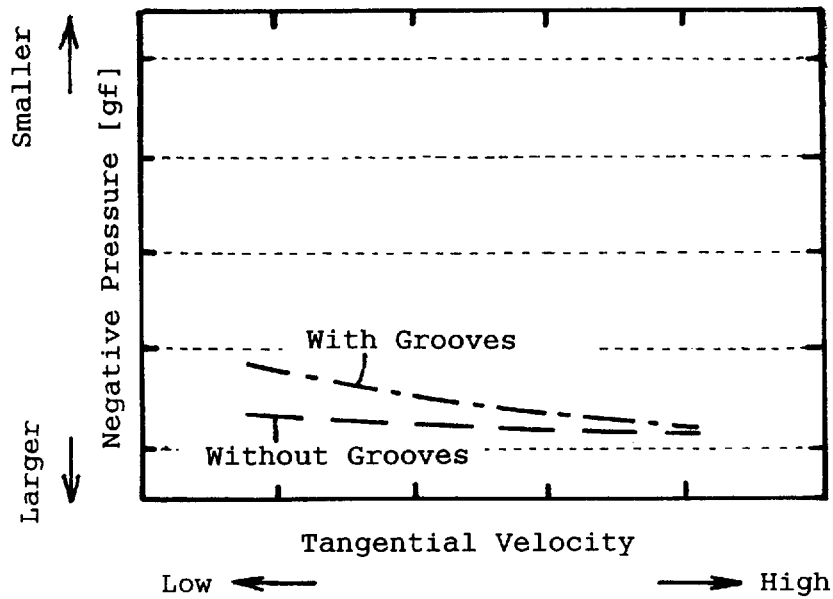
FIG. 5 is a graph demonstrating the effect of the grooves.

The grooves 30 enable the negative pressure to follow the tangential velocity in the negative pressure air bearing slider 14. As shown in FIG. 5 for example, it is observed that the negative pressure increases as the tangential velocity gets faster, even if front and rear rails 21, 23 of lower heights are employed. A slider without grooves 30 leads to a saturation of the negative pressure at a lower tangential velocity, whereby the negative pressure cannot increase anymore as the tangential velocity gets higher.

The grooves 30 are preferably positioned as far downstream as possible. If so, the cavity surrounded by the front and side rails 21, 29 becomes larger, so that a larger negative pressure can be generated. In addition, the negative pressure area can be shifted downstream. Accordingly, it is possible to further stabilize the flying behavior of the slider body.

Figure 6A:
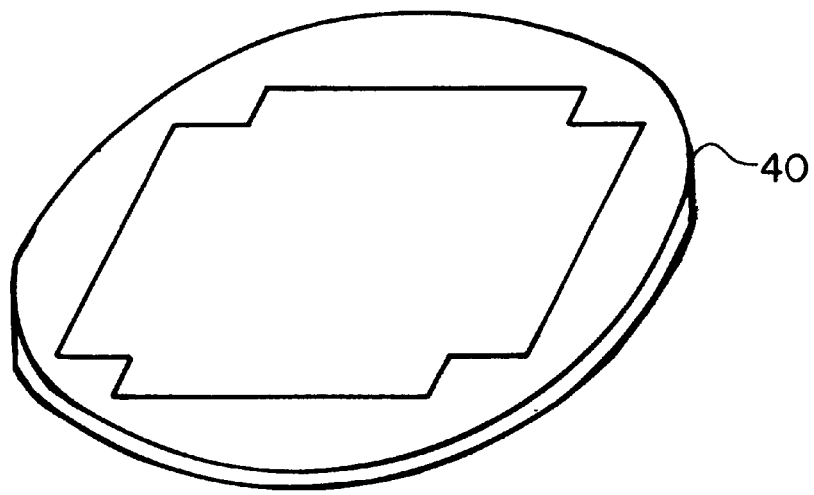
FIGS. 6A–6C schematically illustrate the production method of the negative pressure air bearing slider.

Next, a description will be made of the preferred method of producing the negative pressure air bearing slider 14. As shown in FIG. 6A, a plurality of transducer elements or magnetic head elements are formed on the disk face of a wafer 40, which is preferably made of $Al_2O_3$—TiC with an $Al_2O_3$ layer formed thereon. The transducer elements are respectively formed in blocks, with each defining a single negative pressure air bearing slider 14. For example, 10,000 sliders (arranged a row of 100 by a column of 100, 100× 100=10,000) can be cut out from a wafer of 5 inches in diameter. The transducer elements are covered with a protection layer, preferably made of $Al_2O_3$.

Figure 6B:
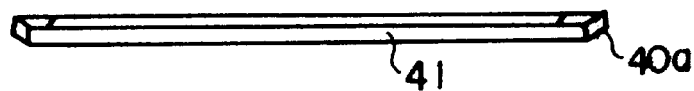
Figure 6C:
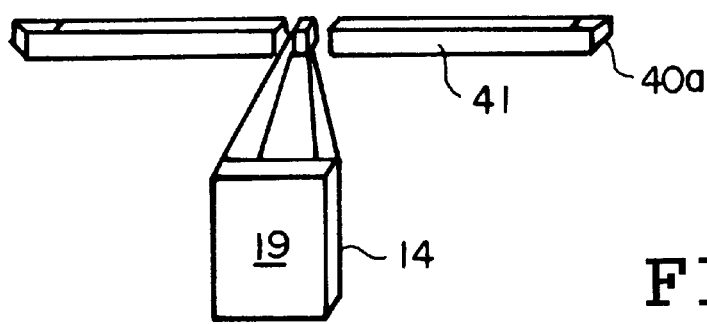

As shown in FIG. 6B, the wafer 40 on which the transducer elements are formed is cut off into wafer bars 40a comprising sliders in a row. The exposed surface 41 of the wafer bar 40a is configured into the bottom 19 of the slider body. Finally, as shown in FIG. 6C, each of the negative pressure air bearing sliders 14 is cut off from the wafer bar 40a.

Figure 7A:
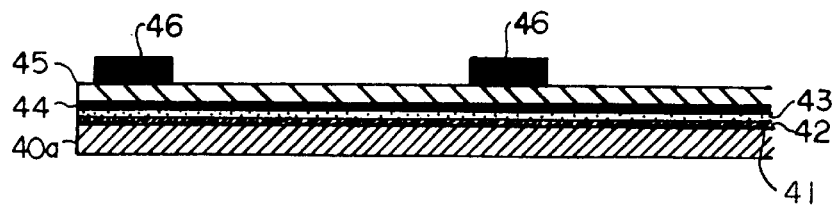
FIGS. 7A–7F are schematic sectional views taken along the line 7—7 in FIG. 2, and these figures illustrate the method of configuring the bottom of the slider body.

Next, a more detailed description will be made for explaining how to configure the bottom 19 of the slider body. As shown in FIG. 7A, the exposed surface 41 of the wafer bar 40a is covered with a diamond-like-carbon (DLC) layer 43 with a Si adhesion layer 42 interposed therebetween. A further DLC layer 45 is then layered over the DLC layer 43 with a Si adhesion layer 44 interposed therebetween. A film resist 46 is formed on the surface of the DLC layer 45 so as to pattern the contours of the pads 31a, 31b, 31c, 31d.

Figure 7B:
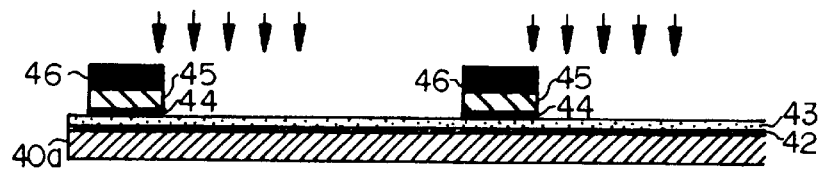
Figure 7C:

As shown in FIG. 7B, the DLC layer 45 and the Si adhesion layer are etched using a reactive ion etching method so as to expose the DLC layer 43. The tip ends of the pads 31a, 31b, 31c, 31d are configured according to the pattern. The resist 46 is then removed as shown in FIG. 7C.

Figure 7D:
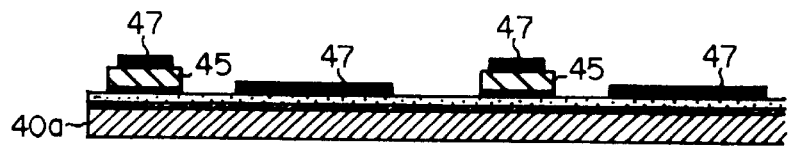
Figure 7E:
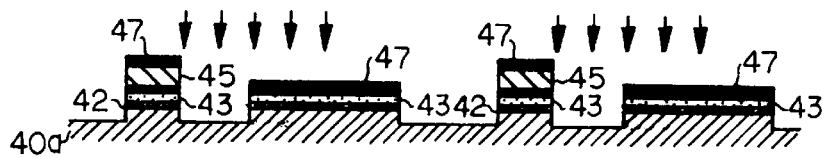
Figure 7F:
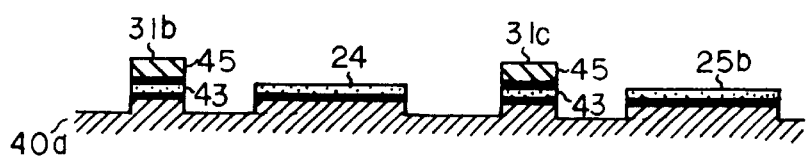

As shown in FIG. 7D, a photoresist 47 is formed to pattern the contours of the first and second air bearing surfaces 24, 25a, 25b. The configured pads 31a, 31b, 31c, 31d are covered with the photoresist 47. After exposure and development, as shown in FIG. 7E, an ion milling method is conducted to etch the DLC layer 43, the Si adhesion layer 42 and the body of $Al_2O_3$—TiC of the wafer bar 40a. As a result, the first and second air bearing surfaces 24, 25a, 25b are configured according to the pattern. At the same time, the configuration of the pads 31a, 31b, 31c, 31d is completed. Thereafter, the photoresist 47 is removed as shown in FIG. 7F.

Figure 8A:
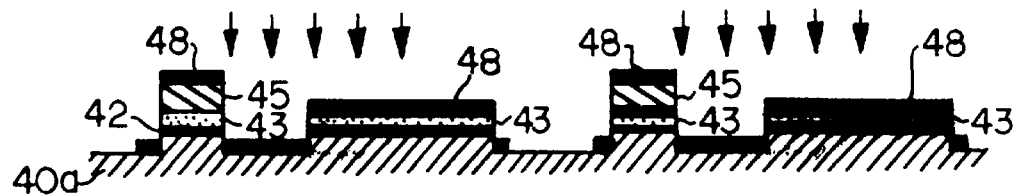
FIGS. 8A–8B are schematic sectional views taken along the line 7—7 in FIG. 2, and these figures also illustrate the method of configuring the bottom of the slider body.
Figure 8B:
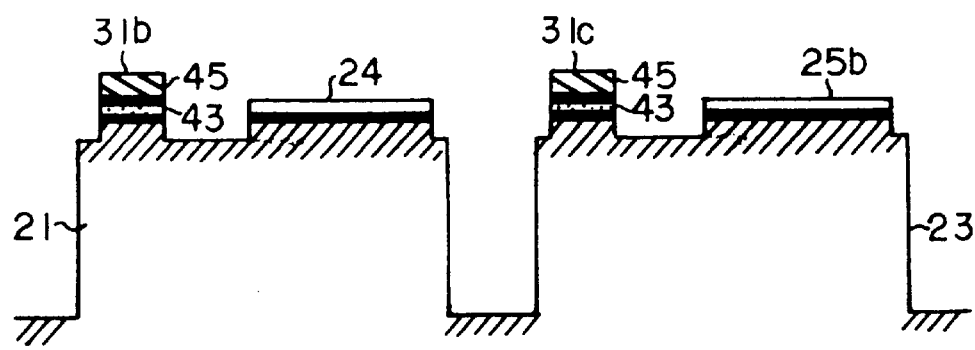

Then, as shown in FIG. 8A, a photoresist 48 is formed to pattern the contours of the front, side and rear rails 21, 29, 23. The configured pads 31a, 31b, 31c, 31d, and the configured first and second air bearing surfaces 24, 25a, 25b are covered with the photoresist 48. After exposure and development, an ion milling method is conducted to further etch the body of $Al_2O_3$—TiC of the wafer bar 40a. As a result, the front, side and rear rails 21, 29, 23 are configured according to the pattern. When the photoresist 48 is removed as shown in FIG. 8B, the pads 31a, 31b, 31c, 31d appear on the tops of the front, side and rear rails 21, 29, 23, with the tip ends protected by the DLC layer 45. The first and second air bearing surfaces 24, 25a, 25b likewise appear on the tops of the front and rear rails 21, 23, with the tops protected by the DLC layer 43. The configuration of the bottom 19 of the slider body is thus completed.

Figure 9:
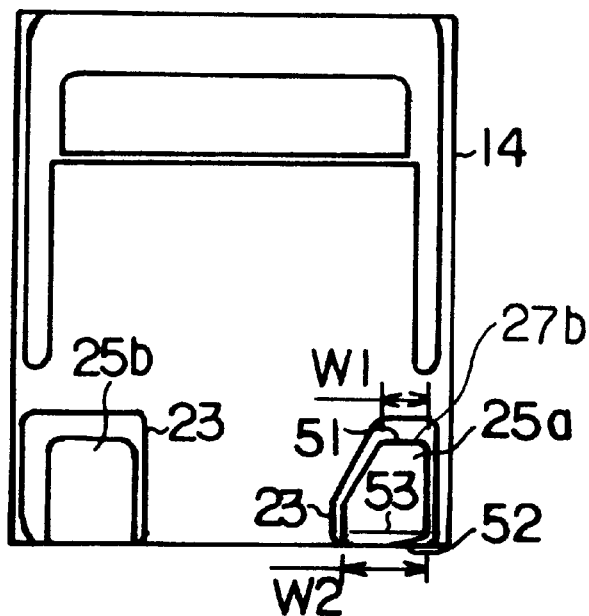
FIG. 9 is a plan view illustrating the configuration of the bottom of the slider body of a modified version of the present invention.

As shown in FIG. 9, for example, the second air bearing surface 25a with the transducer element of the aforementioned negative pressure air bearing slider 14 may include an upstream end 51 extending along a first width W1 in the lateral direction so as to lead to the step 27b, and a downstream end 52 extending along a second width W2 that is larger than the first width W1 in the lateral direction. For example, in the case where the transducer element comprises a magnetoresistance (MR) element, the MR element should be protected between a pair of shield layers 53. If the shield layers 53 fail to have a lateral size that is large enough to shield the MR element from magnetic interference of the vicinal magnetic field, the MR element will not be able to correctly read data off of the magnetic disk 13. The wider downstream end 52 enables the second air bearing surface 25a to be of a smaller area, while still keeping the larger lateral size of the shield layers 53 at the same time, thereby making the lift of the second air bearing surface 25b larger than the lift of the second air bearing surface 25a.

Figure 10:
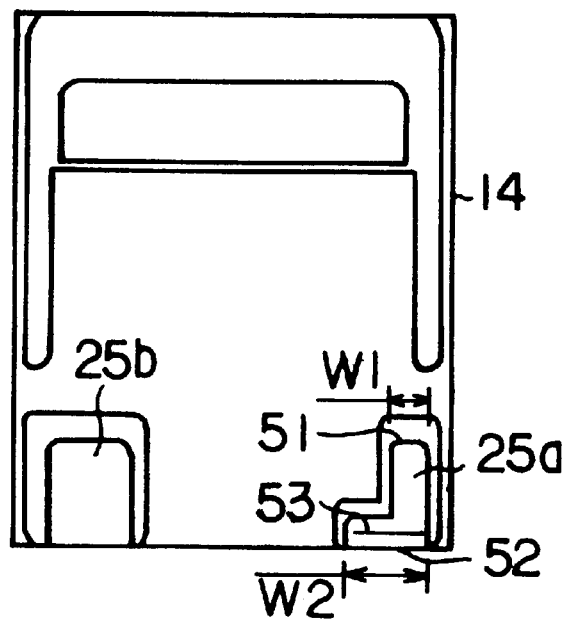
FIG. 10 is a plan view illustrating the configuration of the bottom of the slider body of a second modified version of the present invention.
Figure 11:
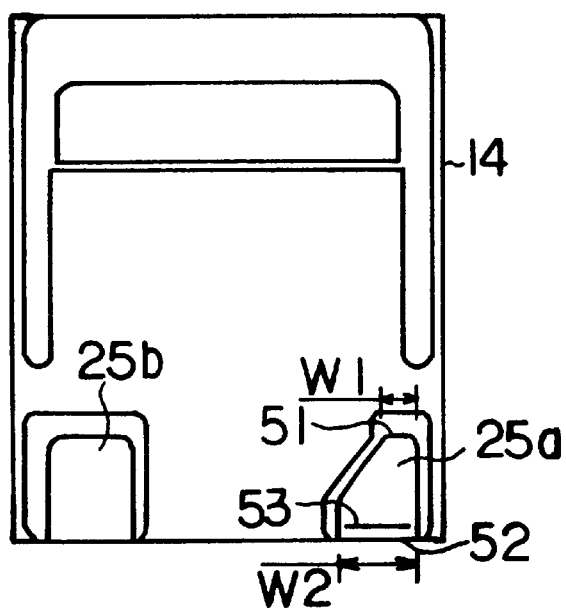
FIG. 11 is a plan view illustrating the configuration of the bottom of the slider body of a third modification of the present invention.

The wider downstream end 52 of the second width W2 can be realized by varying the lateral width of the second air bearing surface 25a in the longitudinal direction. For example, as shown in FIG. 9, the second air bearing surface 25a may be continuously enlarged along its lateral width from the upstream end 51 of the first width W1 to the downstream end 52 of the second width W2. As a modification, the second air bearing surface 25a may maintain the first width W1 of the upstream end 51 along its longitudinal direction until just before reaching the downstream end 52 of the second width W2, as shown in FIG. 10, in which the second air bearing surface 25a is generally L-shaped. FIG. 11 shows an additional modification which is substantially a combination of part of FIGS. 9 and 10, in which the second air bearing surface 25a maintains the first width W1 of the upstream end 51 until the lateral width of the second air bearing surface 25a starts to continuously enlarge toward the second width W2 of the downstream end 52.

Figure 12:
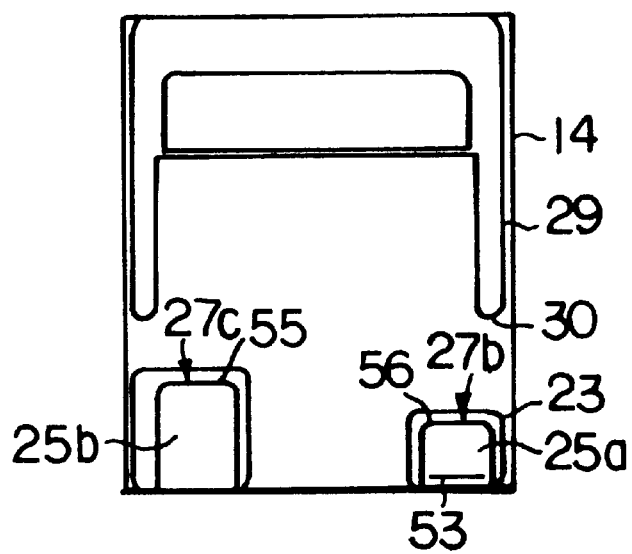
FIG. 12 is a plan view illustrating the configuration of the bottom of the slider body of a fourth modification of the present invention.

When the lift at the second air bearing surface 25b is intended to be larger than that of the second air bearing surface 25a with the transducer element, as shown in FIG. 12, an upstream end 56 extending in the lateral direction so as to define the step 27b on the second air bearing surface 25a may be disposed more downstream than an upstream end 55 extending in the lateral direction so as to define the step 27c on the second air bearing surface 25b. Such disposition of the second air bearing surfaces 25a, 25b serves to reduce the length of the second air bearing surface 25a in the direction of the air stream as compared with that of the second air bearing surface 25b. Accordingly, the smaller second air bearing surface 25a can be realized to set the lift at the second air bearing surface 25a with the transducer element to be smaller than that of the second bearing surface 25b without a transducer element. Thus, it is possible to reduce the lift at the second air bearing surface 25a without a reduction in the lateral width of the shield layers 53.

Figure 13:
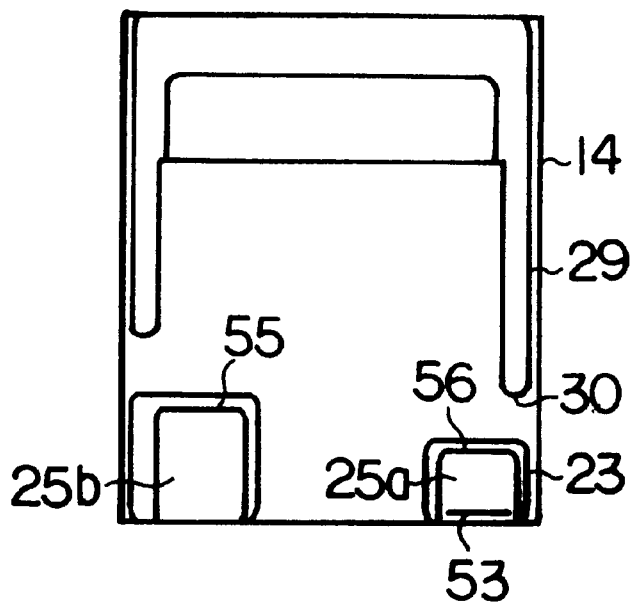
FIG. 13 is a plan view illustrating the configuration of the bottom of the slider body of a fifth modification of the present invention.

When the upstream end 56 of the second air bearing surface 25a is displaced downstream as described above, it is preferable to adjust the size of the groove 30 between the rear and side rails 23, 29. As shown in FIG. 12, for example, if the side rail 29 fails to extend toward the rear rail 23 to follow the displacement of the upstream end 56 of the second air bearing surface 25a, the groove 30 becomes larger or wider. The wider groove 30 may release the negative pressure generated behind the front rail 21 as describe above. On the other hand, when the side rail 29 is extended to follow the displacement of the upstream end 56 as shown in FIG. 13, a smaller or narrower groove 30 can be obtained, so that a higher negative pressure can be maintained behind the front rail 21. A higher negative pressure enables the second air bearing surface 25a to reliably approach the disk surface as closely as possible.

Figure 14:
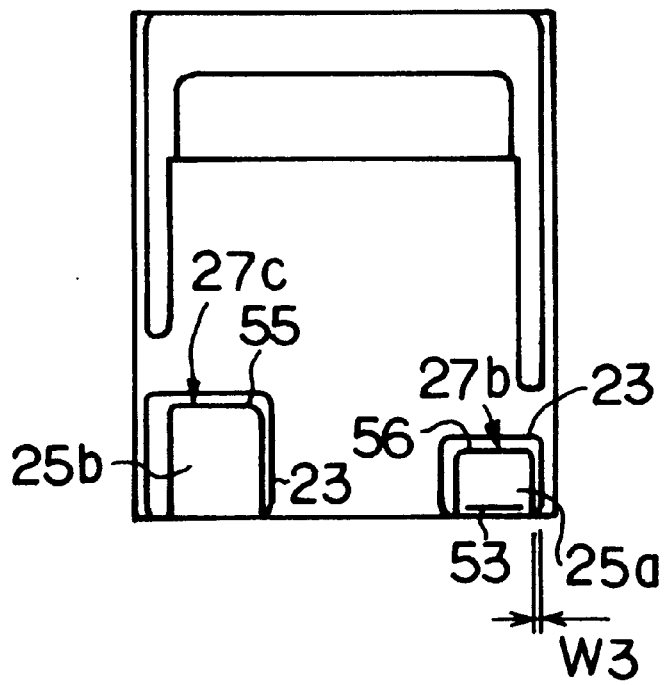
FIG. 14 is a plan view illustrating the configuration of the bottom of the slider body of a sixth modification of the present invention.

Furthermore, when the lift at the second air bearing surface 25a with the transducer element needs to be reduced, as shown in FIG. 14, for example, the position of the second air bearing surface 25a can be determined relative to the lower surface of the rear rail 23. The aforementioned higher positive pressure generated at the steps 27b, 27c depends not only upon their areas and heights, in addition to the areas of the second air bearing surfaces 25a, 25b, but also upon the areas of the lower surfaces leading to the steps 27b, 27c on the rear rails 23. Smaller lower surface areas make for less positive pressure, while larger lower surface areas make for larger positive pressure. Accordingly, as shown in FIG. 14, if the lateral width W3 of the lower surface area leading to the step 27b facing outwardly of the slider body on the rear rail 23 is reduced, the lift can be reduced at the second air bearing surface 25a with the transducer element, since the step 27b facing outwardly of the slider body tends to receive a larger amount of the air stream than the step 27b facing inwardly of the slider body.

Figure 15:
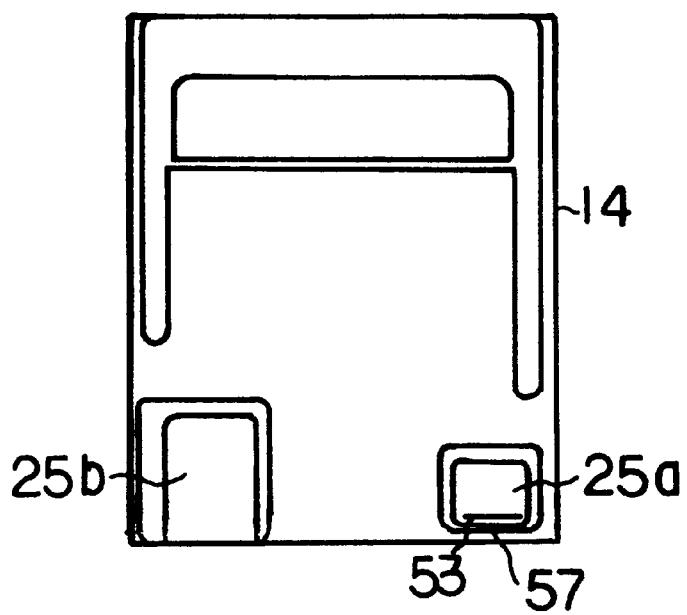
FIG. 15 is a plan view illustrating the configuration of the bottom of the slider body of a seventh modification of the present invention.

Furthermore, when the lift at the second air bearing surface 25a with the transducer element needs to be reduced, as shown in FIG. 15, for example, the second air bearing surface 25a may include a downstream end 57 extending in the lateral direction at the downstream position which can be displaced upstream. As described above, the negative pressure air bearing slider 14 has the maximum positive pressure at the downstream end of the slider body as is apparent from FIG. 3. Accordingly, when the downstream end 57 is displaced upstream so as to reduce the area of the second air bearing surface 25a, the lift can be efficiently reduced at the second air bearing surface 25a with the transducer element.

It should be noted that the negative pressure air bearing slider 14 of the present invention may be employed in storage disk drives other than the aforementioned hard disk drives (HDD) 10.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A negative pressure air bearing slider comprising:
   a first air bearing surface formed on a bottom of a slider body near an upstream end thereof, said first air bearing surface extending in a lateral direction of the slider body;

a pair of second air bearing surfaces formed on the bottom of the slider body near a downstream end thereof, said pair of second air bearing surfaces being separated from the first air bearing surface, and said pair of second air bearing surfaces being spaced apart from each other in the lateral direction so as to define an air stream passage therebetween, wherein one of said second air bearing surfaces has a transducer element embedded therein, and said second air bearing surface with said transducer element has a surface area smaller than that of the other second air bearing surface; and said second air bearing surface with said transducer element has an upstream end of a first width in the lateral direction that is substantially parallel to said downstream end of said slider body, and a downstream end of a second width in the lateral direction that is larger than said first width.

2. The negative pressure air bearing slider according to claim 1, wherein said first air bearing surface is defined upon a lower surface of a front rail that extends from the bottom of the slider body near said upstream end, and wherein said front rail also extends in the lateral direction of the slider body.

3. The negative pressure air bearing slider according to claim 2, wherein said first air bearing surface is connected to the lower surface of said front rail via a step.

4. The negative pressure air bearing slider according to claim 2, wherein a pad is formed on the lower surface of said front rail so as to prevent said first air bearing surface from sticking to a disk surface of a storage disk when the slider body is seated upon the disk surface.

5. The negative pressure air bearing slider according to claim 2, wherein said pair of second air bearing surfaces are respectively defined on lower surfaces of a pair of rear rails that extend from the bottom of the slider body near the downstream end thereof, further wherein said pair of rear rails are spaced apart from each other in the lateral direction so as to define the air stream passage therebetween.

6. The negative pressure air bearing slider according to claim 5, wherein said second air bearing surfaces are each connected, respectively, to the lower surfaces of a corresponding one of said rear rails via a step.

7. The negative pressure air bearing slider according to claim 5, wherein a pad is formed on the lower surface of at least one of said rear rails so as to prevent the second air bearing surface from sticking to a disk surface when the slider body is seated upon the disk surface.

8. The negative pressure air bearing slider according to claim 5, further including a pair of side rails that are formed on the bottom of the slider body so as to extend downstream from lateral ends of said front rail.

9. The negative pressure air bearing slider according to claim 8, wherein said side rails each have a thickness in the lateral direction that is smaller than the thickness in the lateral direction of each of the rear rails.

10. The negative pressure air bearing slider according to claim 8, wherein there is a groove formed between each of said side rails and its corresponding one of said rear rails, whereby said groove draws air running around said front rail into said air stream passage.

11. The negative pressure air bearing slider according to claim 10, wherein said second air bearing surface with said transducer element is connected to said corresponding rear rail via a step on an upstream side thereof and said second air bearing surface without said transducer is connected to said corresponding rear rail via another step on an upstream side thereof, wherein said step on said second air bearing surface with said transducer element is located farther downstream than said other step on said second air bearing surface without said transducer.

12. The negative pressure air bearing slider according to claim 11, wherein said groove near said second air bearing surface with said transducer is longer than said groove near said second air bearing surface without said transducer.

13. The negative pressure air bearing slider according to claim 11, wherein said groove near said second air bearing surface with said transducer is approximately the same length as said groove near said second air bearing surface without said transducer.

14. The negative pressure air bearing slider according to claim 11, wherein said second air bearing surface with said transducer element has a downstream end extending in the lateral direction that is displaced upstream to be separated from said downstream end of said slider body.

15. The negative pressure air bearing slide according to claim 5, wherein one of said second air bearing surfaces has a transducer embedded therein, and further wherein said second air bearing surface with said transducer has a side portion thereof that is angled such that an upstream end of said second air bearing surface with said transducer is of a smaller width that a downstream end of said same second air bearing surface.

16. The negative pressure air bearing slide according to claim 5, wherein one of said second air bearing surfaces has a transducer embedded therein, and further wherein said second air bearing surface with said transducer is generally L-shaped such that an upstream end thereof is of a smaller width that a downstream end thereof.

17. A storage disk drive comprising:

at least one disk adapted to have information stored thereon;

a motor for rotating said at least one disk;

an actuator arm adapted to swing about a shaft for accessing different radial portions of said at least one disk;

a negative pressure air bearing slider located near a distal end of said actuator arm; and wherein said negative pressure air bearing slider includes:

a first air bearing surface formed on a bottom of a slider body near an upstream end thereof, said first air bearing surface extending in a lateral direction of the slider body;

a pair of second air bearing surfaces formed on the bottom of the slider body near a downstream end thereof, said pair of second air bearing surfaces being separated from the first air bearing surface, and said pair of second air bearing surfaces being spaced apart from each other in the lateral direction so as to define an air stream passage therebetween, wherein one of said second air bearing surfaces has a transducer element embedded therein, and said second air bearing surface with said transducer element has a surface area smaller than that of the other second air bearing surface; and said second air bearing surface with said transducer element has an upstream end of a first width in the lateral direction that is substantially parallel to said downstream end of said slider body, and a downstream end of a second width in the lateral direction that is larger than said first width.

* * * * *